United States Patent
Besaucele et al.

(10) Patent No.: US 7,471,708 B2
(45) Date of Patent: Dec. 30, 2008

(54) GAS DISCHARGE LASER OUTPUT LIGHT BEAM PARAMETER CONTROL

(75) Inventors: Herve A. Besaucele, San Diego, CA (US); Igor V. Fomenkov, San Diego, CA (US); William N. Partlo, Poway, CA (US); Fedor B. Trintchouk, San Diego, CA (US); Hao Ton That, San Diego, CA (US)

(73) Assignee: Cymer, Inc., San Diego, CA (US)

( * ) Notice: Subject to any disclaimer, the term of this patent is extended or adjusted under 35 U.S.C. 154(b) by 25 days.

(21) Appl. No.: 11/095,293

(22) Filed: Mar. 31, 2005

(65) Prior Publication Data

US 2006/0227839 A1 Oct. 12, 2006

(51) Int. Cl.
*H01S 3/13* (2006.01)
*H01S 3/00* (2006.01)
*H01S 3/22* (2006.01)

(52) U.S. Cl. .............. 372/29.013; 372/38.02; 372/38.08; 372/55

(58) Field of Classification Search ........... 372/29.013, 372/29.012
See application file for complete search history.

(56) References Cited

U.S. PATENT DOCUMENTS

| | | | | |
|---|---|---|---|---|
| 516,847 A | * | 3/1894 | Thomson | 336/41 |
| 1,836,808 A | * | 12/1931 | Marrison | 336/179 |
| 1,892,204 A | * | 12/1932 | Bol | 336/75 |
| 1,913,978 A | * | 6/1933 | Ewen | 361/274.1 |
| 2,410,222 A | * | 10/1946 | Lawrence, Jr. | 334/44 |
| 3,582,808 A | * | 6/1971 | Davis | 330/178 |
| 3,633,127 A | * | 1/1972 | Caristi et al. | 372/38.03 |
| 4,112,392 A | * | 9/1978 | Andersson et al. | 372/61 |
| 4,573,160 A | * | 2/1986 | Cirkel et al. | 372/38.03 |
| 4,611,327 A | * | 9/1986 | Clark et al. | 372/58 |
| 4,837,773 A | * | 6/1989 | Wakata et al. | 372/86 |
| 5,042,047 A | * | 8/1991 | Ono et al. | 372/86 |
| 6,005,880 A | * | 12/1999 | Basting et al. | 372/38.04 |
| 6,020,723 A | * | 2/2000 | Desor et al. | 320/166 |
| 6,128,323 A | * | 10/2000 | Myers et al. | 372/38.1 |
| 6,240,112 B1 | * | 5/2001 | Partlo et al. | 372/34 |
| 6,330,261 B1 | * | 12/2001 | Ishihara et al. | 372/38.1 |
| 6,636,546 B2 | * | 10/2003 | Kakizaki et al. | 372/57 |
| 6,757,315 B1 | * | 6/2004 | Bragin et al. | 372/57 |
| 6,785,316 B1 | * | 8/2004 | Bragin et al. | 372/87 |
| 6,834,066 B2 | * | 12/2004 | Bragin et al. | 372/38.1 |
| 6,847,670 B1 | * | 1/2005 | Kakizaki et al. | 372/57 |
| 6,862,307 B2 | * | 3/2005 | Osmanow et al. | 372/38.03 |

(Continued)

*Primary Examiner*—Minsun Harvey
*Assistant Examiner*—Sean Hagan

(57) ABSTRACT

A line narrowed gas discharge laser system and method of operation are disclosed which may comprise: an oscillator cavity; a laser chamber comprising a chamber housing containing a lasing medium gas; at least one peaking capacitor electrically connected to the chamber housing and to a first one of a pair of electrodes; a second one of the pair of electrodes connected to an opposite terminal of the at least one peaking capacitor; a current return path connected to the chamber housing; the one terminal, the first one of the electrodes, the lasing medium gas, the second one of the electrodes, the current return path and the second terminal forming a head current inductive loop having an inductance unique to the particular head current inductive loop; a spectral quality tuning mechanism comprising a mechanism for changing the particular head current inductive loop inductance value for the particular head current inductance loop.

26 Claims, 9 Drawing Sheets

U.S. PATENT DOCUMENTS

| | | | |
|---|---|---|---|
| 2002/0012371 A1* | 1/2002 | Bragin et al. | 372/38.09 |
| 2002/0015430 A1* | 2/2002 | Osmanow et al. | 372/55 |
| 2002/0071469 A1* | 6/2002 | Kakizaki et al. | 372/57 |
| 2003/0012234 A1* | 1/2003 | Watson et al. | 372/25 |
| 2003/0031216 A1* | 2/2003 | Fallon et al. | 372/29.01 |

* cited by examiner

US 7,471,708 B2

GAS DISCHARGE LASER OUTPUT LIGHT BEAM PARAMETER CONTROL

FIELD OF THE INVENTION

The present invention related to gas discharge lasers utilized in application where very precise control of gas discharge laser output light pulse beam (also refer to as simply a pulsed laser output beam) parameters, e.g., wavelength, bandwidth and dose stability, e.g., within some relatively precisely defined range of values, for applications, such as, integrated circuit photolithography.

BACKGROUND OF THE INVENTION

Techniques have been used to control higher harmonic vibration and noise in helicopters, and adaptive noise cancellation, which is widely used. Applicants propose utilizations in the field of gas discharge laser output light pulse beam pulse parameter modification and control.

Reducing the blower speed more or less drastically at low laser output light pulse beam pulse repetition rates may improve the low repetition rate stability of earlier ArF lasers. However, this is not a favorable state of operation since, once one drops the blower speed one cannot fire again at a relatively higher repetition rate until the blower is spun up again to accommodate, e.g., for the needed arc free blower speed for the higher pulse repetition rate.

Requirements for dose stability for next generation lasers, e.g., for use in line narrowed high pulse repetition rate, i.e., 3 KHz and above gas discharge laser systems, e.g., for uses in integrated circuit photolithography applications have significantly tightened recently, form, e.g., about a 00.25% variation over a given exposure window to about 00.10% over a given exposure window, related at least in m=part to the reducing in size of the exposure windows, such that the dose per pulse must be more precisely controlled since there are less pulses in an exposure window to average out for proper does per pulse distribution over the exposure window, e.g., also due to increasing laser pulse repetition rates to, e.g., 6 KHz, which may even further reduce the allowable pulse to pulse dose variation to, e.g., 00.08% or less. Applicants propose ways to address this increasingly more critical laser output light pulse beam pulse parameter specification by the users of the light, e.g., makers of scanners for photolithography.

SUMMARY OF THE INVENTION

A line narrowed gas discharge laser system and method of operation adapted to fine tune a spectral quality of a laser output light pulse beam is disclosed which may comprise: an oscillator cavity; a laser chamber within the oscillator cavity comprising a chamber housing containing a lasing medium gas; at least one peaking capacitor one terminal of which is electrically connected to the chamber housing and to a first one of a pair of gas discharge electrodes; a second one of the pair of gas discharge electrodes connected to an opposite terminal of the at least one peaking capacitor and insulated from the chamber housing; a current return path by which the at least one peaking capacitor is electrically connected to the chamber housing; the one terminal of the at least one peaking capacitor, the first one of the pair of gas discharge electrodes, the lasing medium gas, the second one of the pair of gas discharge electrodes, the current return path and the second terminal of the at least one peaking capacitor forming a head current inductive loop having an inductance value unique to the particular head current inductive loop for a given laser system; a spectral quality tuning mechanism comprising a mechanism for changing the particular head current inductive loop inductance value for the particular head current inductance loop. The apparatus and method of used may also comprise a line narrowing module within the oscillator cavity; and the change in the particular head current loop inductance tuning the duration of the gas discharge for the particular gas discharge laser system and the impact of the line narrowing module on the spectral quality of the laser output light pulse beam produced by the particular laser system. The spectral quality may be bandwidth. The spectral quality tuning mechanism may comprise a mechanism that changes the size of the head current inductive loop for the particular laser system. The apparatus and method may further comprise a high voltage bus in electrical connection with the opposite terminal of the at least one peaking capacitor; and the spectral quality tuning mechanism may comprise a displacement control mechanism controlling the displacement of the high voltage bus from the opposite terminal of the at least one peaking capacitor. The spectral quality tuning mechanism may be manually operated to adjust the particular spectral quality for a particular laser system at the time of manufacture or as may be necessary in the field during laser system operating life, or may comprise an active control system to adjust the particular head current inductive loop inductance based upon feedback control of a controller having as an input an output of a spectral quality measuring system. Also disclosed is a high repetition rate gas discharge laser system adapted to control the pulse energy of a laser output light pulse beam pulses at a particular pulse repetition rate which may comprise a laser gas circulating rotary blower; a blower rotation speed controller operating the blower within a currently applicable range of appropriate arc free blower speeds for a given laser output light pulse beam pulse repetition rate; a pulse energy controller providing an output blower rotation speed within the currently applicable range of arc free blower speeds based upon the pulse repetition rate and a signal representative of the scan window number of pulses. The blower rotation speed being may be selected to align blower speed harmonic related dose transients within a respective one of a plurality of exposure window and laser pulse repetition rate related Fourier transform null points and/or to place an integer number of the disturbance waveform within the time period of the exposure window duration. Also disclosed is a high repetition rate gas discharge laser system adapted to control the pulse energy of a laser output light pulse beam pulses at a particular pulse repetition rate which may comprise a laser gas circulating fan; a pulse energy controller producing a pulse energy control signal for a laser output light pulse beam output pulse at least in part based upon a measured laser output light pulse beam pulse energy for at least one preceding laser output light pulse beam pulse; a pulse energy control signal correction mechanism which may comprise: a gas circulating fan phase estimator producing a phase estimation for the laser output light pulse beam pulse; and a correction computer computing the correction for the pulse based on the phase estimate and a selected harmonic mode.

DETAILED DESCRIPTION OF PREFERRED EMBODIMENTS

Figure 1:
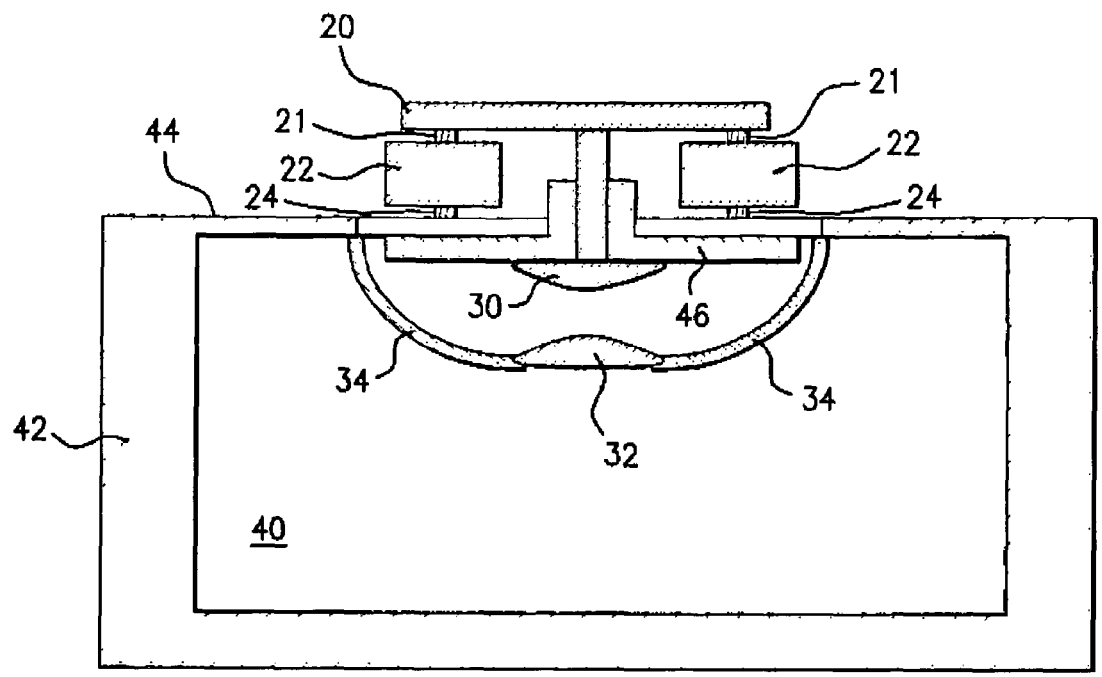
FIG. 1 shows, partly schematically, an example of the configuration of a head current inductance loop for a particular family of laser systems that is utilized to illustrate aspects of an embodiment of the present invention.

Applicants have determined that the inductance of the discharge chamber in a gas discharge laser can affect the temporal characteristic of the laser pulse in such way that it increases spectral bandwidth in a monotonic way over a reasonably wide range. the inductance is formed by the physical elements of the discharge electrical path forming a loop that has a natural inductance. The loop is formed from a high voltage bus 20 on one terminal 21 of a capacitor bank of peaking capacitors 22 in parallel, supplying a high voltage, e.g., around 20,000 volts to a cathode electrode 30, then through the discharge itself to an anode electrode 32 which is grounded to the chamber 40 body 42 in electrical contact with the grounded terminal 24 of the capacitor bank through a plurality of current return tines 34 connected between an anode support bar (not shown in FIGS. 1-3, holding the anode 32 opposite the cathode 30, and the grounded chamber top or head 44. The chamber head and the grounded terminals 24 are separated from the cathode by an insulator 46.

Applicants have determined that the inductance of the current loop formed by the peaking capacitors and the chamber head has a significant effect on laser bandwidth. The inductance can, e.g., directly affect the peak current of the discharge (~sqrt(LC)) which in turns can affect how fast the laser gain develops in the gas discharge laser gas gain medium, e.g., in an ArF, KrF, $F_2$, XeCl or XeF laser or the like gas discharge lasers. Slower "turn on" of the laser gain can, e.g., leads to a narrower spectrum as the laser oscillation takes more time, i.e. more round trips through the line narrowing module ("LNM") to develop. An example of the effect of head inductance on Bandwidth is shown in the FIGS. 5 and 6.

According to aspects of an embodiment of the present invention applicants propose to vary the head inductance to obtain fine tuned bandwidth ("BW") control. This can be done periodically, e.g., at the time of laser system manufacture to fine tune the bandwidth of the particular laser that is getting ready to be shipped, with periodic adjustment in the field as necessary over time, or can be done actively, e.g., on a shot to shot or burst to burst basis. There can be multiple embodiments. For example, according to aspects of an embodiment of the present invention one could have adjustable spacers or spacers of varying lengths that could be selectively installed and switched as necessary, allowing for the change in head inductance. Alternatively, the spacers 50 could be made to be capable of actively changing the head inductance, e.g., being screw threaded into threaded holes in the bus plate 20 and operated manually, e.g., with a screw driver or automatically with a stepper motor 60 under the control of a bandwidth controller of laser system controller 70 as shown in FIG. 3.

Figure 2:
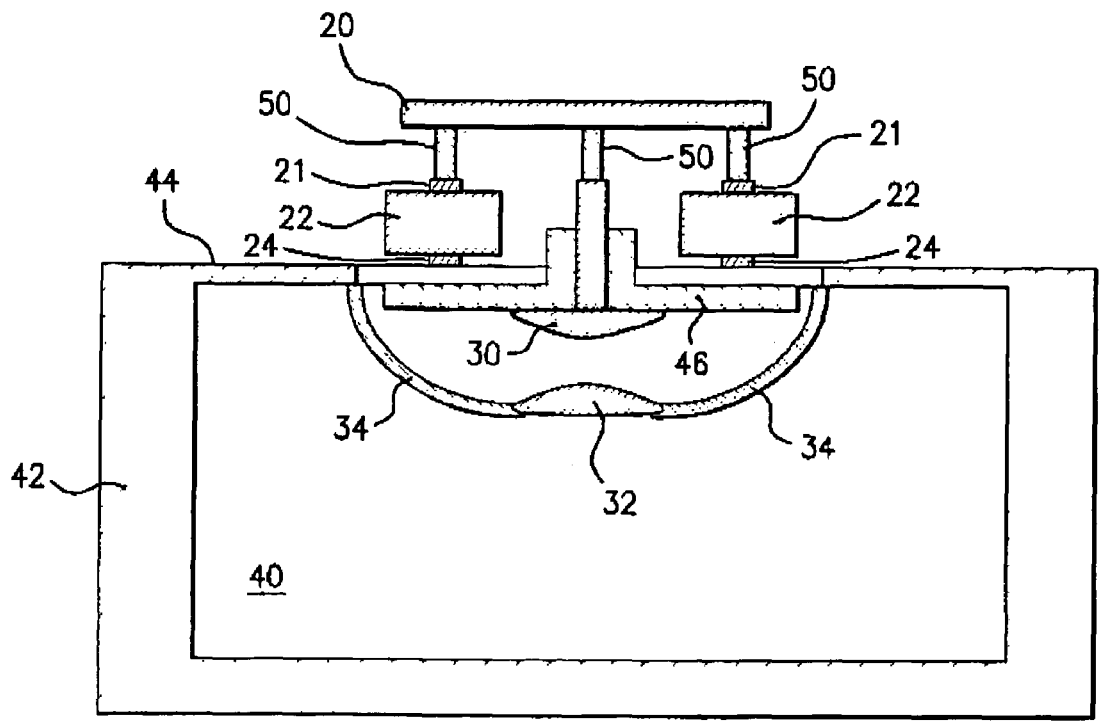
FIG. 2 shows, partly schematically, another example of the configuration of a head current inductance loop for a particular family of laser systems that is utilized to illustrate aspects of an embodiment of the present invention.
Figure 3:
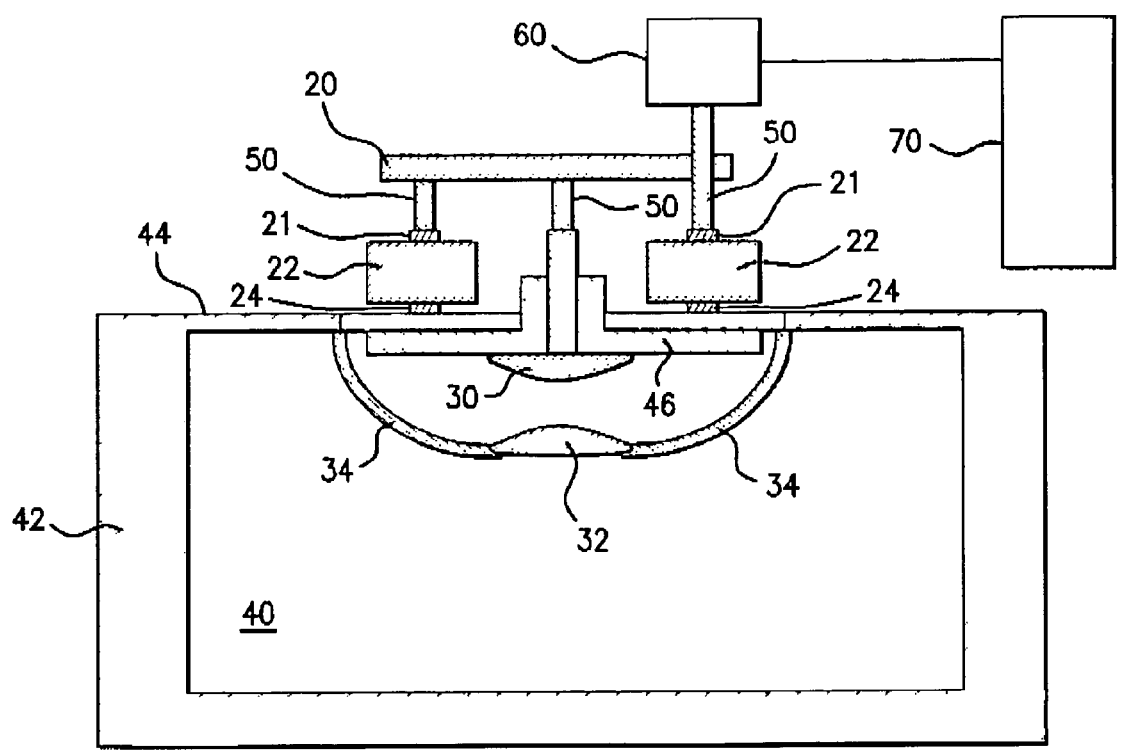
FIG. 3 shows, partly schematically, a further example of the configuration of a head current inductance loop for a particular family of laser systems that is utilized to illustrate aspects of an embodiment of the present invention.

FIG. 1-3 illustrate schematically the head configurations for several laser systems sold by applicants' assignee Cymer, Inc., i.e., an NL7000 illustrated schematically in FIG. 1, having a head inductance of about 2.89 nH, an ELS 7000K illustrated schematically in FIG. 2 having a head inductance of about 4.5 nH, due to being configured to have a larger current loop, and an ELS 7010 illustrated schematically in FIG. 3 (with the addition of an active spacing controller not yet on an ELS 7010, having a head inductance of about 6.0 µH, due to having a physical configuration with a still larger current loop.

Active inductance control could be used in lieu or in addition to other forms f bandwidth control, e.g., waterfront control techniques. According to aspects of an embodiment of the present invention monotonic behavior of BW with inductance can be attained, e.g., at least within the inductance range discussed above for the applicants' assignee's 7000 product family. The affect on the E95 or other spectral energy measurements of bandwidth, i.e., the portion of the spectrum within which some portion of the energy is contained centered on a peak intensity, e.g.., 95%, i.e., E95% or E95, more than width measurements of the spectrum at some percentage of the peak intensity, e.g., half the peak intensity, i.e., full width at half the maximum ("FWHM") or the like, of providing some level of "orthogonality" between the two can be desirable in certain applications. For example in lithography applications for integrated circuit manufacture the ability to control E95 and FWHM at least to some degree independently may be beneficial.

To the first order, inductance is roughly proportional to the area enclosed by the discharge current loop. The three 7000 products illustrated in schematic form in FIGS. 1-3 use different inductance loops as a result of design trade offs, e.g., between bandwidth control and efficiency and stability. The different inductances are obtained by adding spacers 50 between capacitors 22 and the high voltage VCp bus plate 20.

A means to automatically reproduce those changes and stepped or smooth changes in between them in a single configuration would achieve the desired level of bandwidth control.

Figure 4:
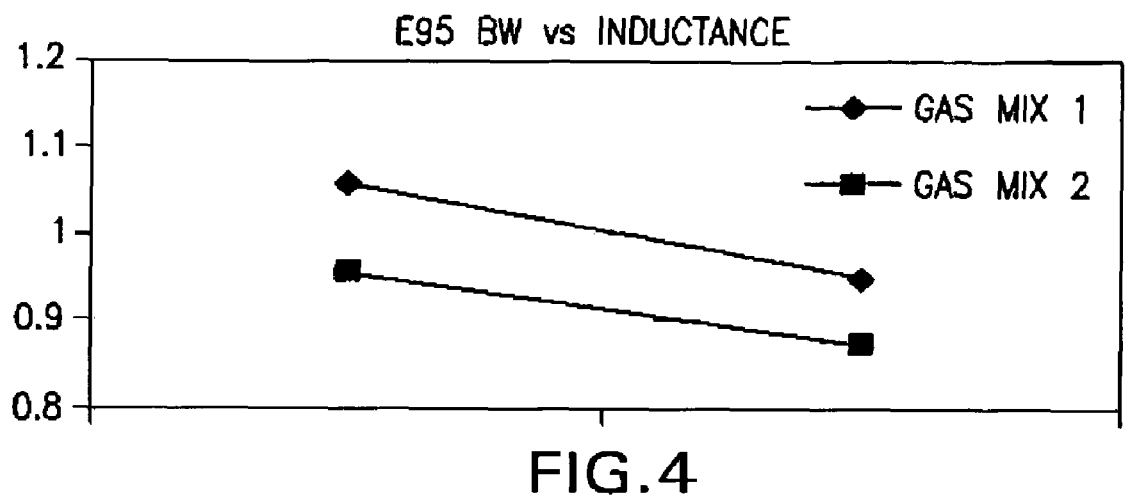
FIG. 4 illustrates graphically the impact of changing inductance of a head current inductance loop on bandwidth as measured by a selected percentage of the spectrum intensity curve centered on a peak of the intensity spectrum.
Figure 5:
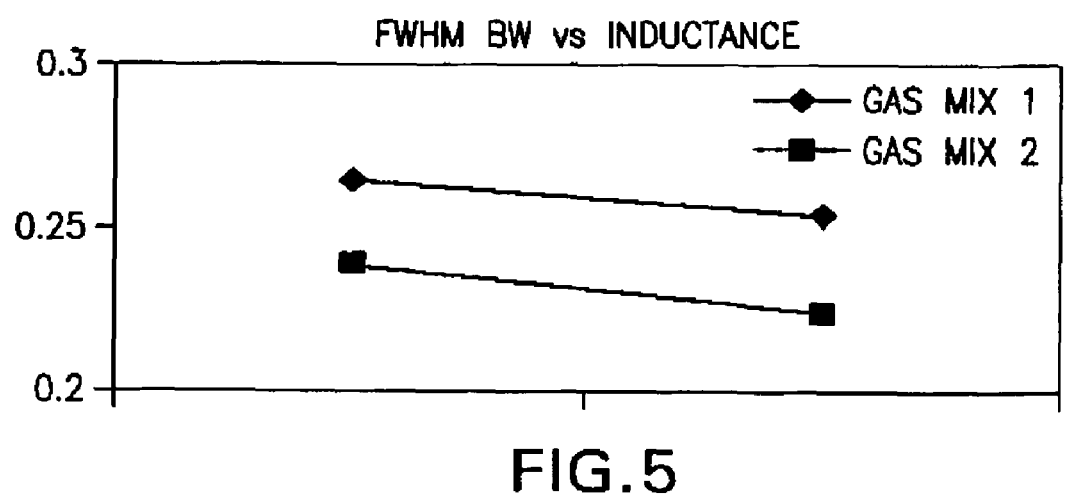
FIG. 5 illustrates graphically the impact of changing inductance of a head current inductance loop on bandwidth as measured by a selected width of the spectrum intensity curve taken at some percentage of the maximum intensity of the spectrum.

FIGS. 4 and 5 show the impact of inductance change on, respectively, E95 measured bandwidth of the laser output and FWHM measured bandwidth of the laser output for different lasers having different head inductances and at different laser gas mixes, e.g., one with higher fluorine content producing the higher bandwidth and vice-versa, and applicants believe that the variation is generally linear between the two measured points shown in FIGS. 4 and 5. FIG. 4 illustrates graphically the change in E95 BW from a relatively lower inductance laser, e.g., a model 7000 sold by applicants' assignee on the left to a higher inductance laser, e.g., a model 7010 sold by applicants' assignee, on the right in FIG. 4. FIG. 5 illustrates the same data for FWHM bandwidth measurement.

According to aspects of an embodiment of the present invention applicants have evaluated the energy dose stability performance of a laser system, e.g., an XLA family laser made by applicants' assignee Cymer, Inc. lasers and have determined that blowers, in particular the MO blower, i.e., in a master oscillator ("MO") portion 110 of a master oscillator-power amplifier ("MOPA") or master oscillator-power oscillator ("MOPO") configured laser system was responsible for a significant portion of the energy error. The MO portion 110 being responsible for creating a relatively low power relatively tightly controlled beam parameter (e.g., in center wavelength and bandwidth) beam for amplification in the PA or PO section (not shown). This configuration may be a two chamber laser with the MO 110 forming one resonator cavity with a laser gas discharge chamber 40 and the other forming an amplifier portion (not shown) with a second laser gas discharge chamber (not shown), forming, e.g., a multiple pass, but non-oscillating, amplifier ("PA"), or an oscillating amplifier ("PO"). An energy resonance scan ("ERS") giving dose stability data from an XLA 105 laser has indicated to applicants that a repeatable pattern of dose error vs rep rate occurs.

Figure 6:
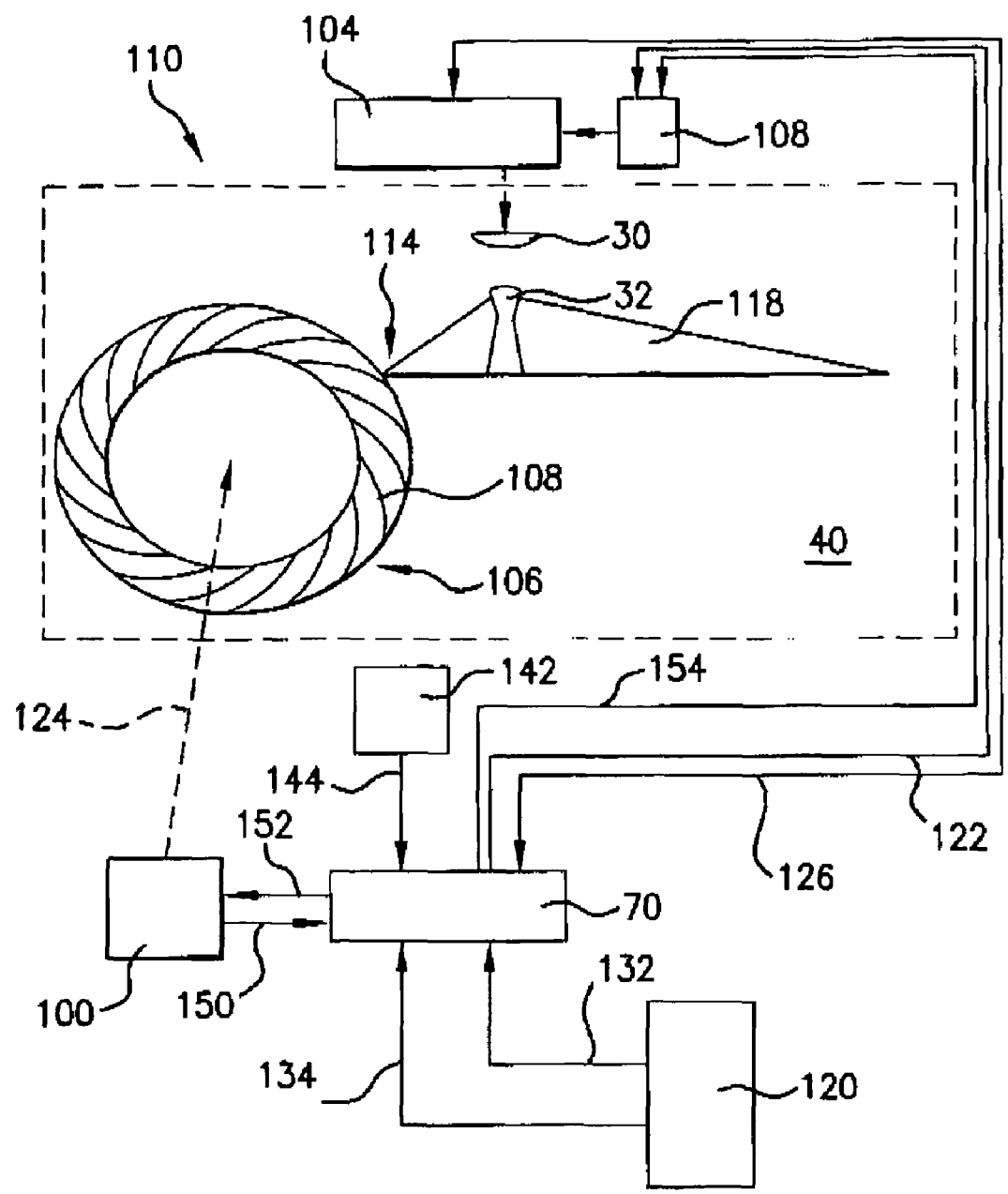
FIG. 6 shows schematically and partly in block diagram form a control system according to aspects of an embodiment of the present invention.

According to aspects of an embodiment of the present invention, as illustrated schematically in FIG. 6, a laser system controller 70 may, e.g., be given information about certain laser system operating parameters, e.g., the operating laser output light pulse beam pulse repetition rate (which will also correspond generally to the rate at which gas discharges are caused between the electrodes 30, 32 in the MO and also therefore, between the electrodes in the PA or PO). Another piece of information used may be, e.g., the window size of an exposure slit, e.g., being utilized by a particular scanner 120 operation in, e.g., integrated circuit photolithography. The exposure slit size is usually measured in pulses within an exposure slit (single burst per exposure slit or pulses within the bursts and bursts per exposure slit). The laser system pulse repetition rate may be determined by the laser system controller 70 from a variety of parameters, ordinarily tracked by such laser system controller 70, as will be understood by those skilled in the art, e.g., the desired pulse repetition rate setting, light out from the MO 110 and/or PA/PO (not shown), charging voltage command signal 122 repetition rate, e.g., to a high voltage resonant charger 108 or peaking capacitor 22 (shown in FIGS. 1-3) discharge voltage zero crossings, occurring in a solid state pulsed power system 104, and provided to the laser system controller 70 from the solid state pulsed power system 104 as signal 126 or the like. The scanner 120 exposure slit size information may be supplied by a signal 132 from the scanner 120 to the laser system controller 70. The scanner may also supply a commanded pulse repetition rate signal 134 which the laser system controller 70 may use for that parameter.

This information according to aspects of an embodiment of the present invention may then be used to better achieve an optimal dose performance. The blower 106 speed can be adjusted by the controller 100 according to a signal received from the laser system controller 70, such that, e.g., the blower 106 harmonic contribution to the dose error is minimized for the particular pulse repetition rate and window size combination.

The blower harmonic(s) that contribute(s) the most to the dose error have been determined to be typically the $2^{nd}$ harmonic of the blower 106 blade 108 passage frequency, e.g., the speed with which the blades 108 of a blower 106 pass, e.g., a knife edge how cut off 114, as is known in the art and can be formed by a leading edge insulative fairing 118 which may cooperate with a trailing edge insulative fairing 118 to provide smooth flow between the electrodes 30, 32 within the laser discharge gas flow path within the chamber 40 as is well known in the art.

This blade 108 passing frequency depends on blower 106 RPM, as set by the blower motor controller, with a signal to the blower motor (not shown) but represented schematically as signal 124 in FIG. 6, and the number of blades 108 around the circumference of, typically, a rotary squirrel cage blower fan 106 (or at least the average number, if, as may sometimes be the case, the fan is arranged in sections with unequal numbers and/or sizes and/or shapes of blades around the circumference for a given section.

Figure 9:
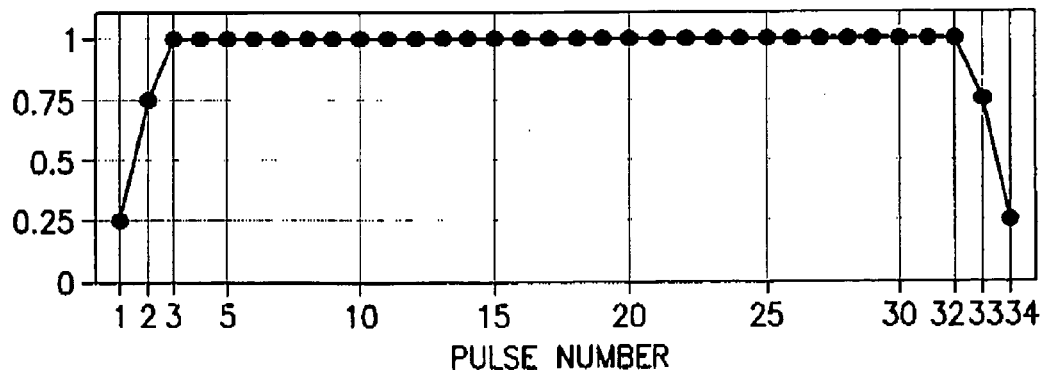
FIG. 9 illustrates in chart form a example of a burst of an output laser light pulse beam pulses defining an exposure window according to aspects of an embodiment of the present invention.

According to aspects of an embodiment of the present invention the lithographic scanner 120 may, e.g., communicate the laser gas discharge light pulse beam pulse repetition rate command signal 134 and the scan window size it intends to use for a given exposure in signal 132 to the laser system controller 70. Based on this information the laser system controller 70 may then, e.g., calculate a blower 106 speed to provide to the blower motor controller 100, such that a particular known disturbance associated with the blower 106 speed falls into one of the zeros of the Fourier-transform (shown, e.g., in FIG. 10) of an exposure window shown, e.g., in FIG. 9. The new blower 106 speed may also be chosen to be always above the minimum arc-free blower speed for the highest repetition rate (e.g. in the 2900-3800 rpm range for a typical ArF 4000 Hz chamber made by applicants' assignee), so that the repetition rate range is not limited by the blower 106 speed choice. That is to say, sufficient gas movement is achieved to prevent arcing in one gas discharge due to debris, e.g., ions of the laser gas mixture constituents remaining sufficiently close to the discharge region between the electrodes 30, 32 in the subsequent gas discharge to give a path of arcing, e.g., from the anode 32 to the grounded chamber body 42 (shown in FIGS. 1-3).

Accordingly regardless of optimization, the scanner 120 is free to fire at any repetition rate it wants. Since the exposure window in the Fourier space has many zeros, an algorithm may be used that has a lot of freedom to choose the new blower 106 speed. Such an algorithm may comprise matching the blower motor frequency transients, e.g., to repetition rate. An algorithm may be employed which may comprise calculating the blower motor frequency RPM from the following equation:

$$n*60/(m*Nblades*RPM)=w/f$$

where w is the exposure window in pulses, f is the pulse repetition rate in Hz, Nblades is the number of blades around the circumference of the blower, e.g., 23, m is the harmonic number whose disturbance to the dose needs to be suppressed, and n is a positive integer: n=1, 2, .... The algorithm may calculate as number of possible RPM from the above equation and then pick the one that is closest to the middle of the acceptable blower speed range, e.g. for a typical blower speed range of 2900 to 3800 rpm out of all the possible solution of the above equations the algorithm would pick one that is closest to 3350 rpm. Alternatively, to minimize the time needed to spin the blower up or down to the new blower speed setpoint, the algorithm may pick the new blower speed from the solutions of the above equation such that a) it falls within the acceptable blower speed range, e.g. between 2900 and 3800 rpm and also b) it is the closest to the current blower speed.

The scanner 120 may the, e.g., pick the new blower 106 speed that is not too far from the previous blower 106 speed, i.e., so that the adjustment can happen quickly, e.g., during the pre-exposure bursts (i.e., used for calibration, recovery, etc.) or even during an inter-burst interval.

Greater integrated energy dose stability, according to aspects of an embodiment of the present invention may be achieved through selecting the blower speed such that an integer number of the periods of the blower harmonic oscillation falls within the duration of one exposure window. The time domain and the Fourier domain are two different ways of looking at the same data/signal/phenomenon/algorithm/etc. Looking at the issues being addressed from the Fourier power spectrum point of view involves the correct analysis tool for detecting periodic disturbances in energy/dose. The Fourier power spectrum is the best way to detect/analyze them.

According to aspects of an embodiment of the present invention, unlike proposals for drastic reduction in blower speed for low repetition rate laser operation, e.g., for older ArF systems, which are currently not needed anyway due to improved due to more recent chamber designs, e.g., incorporating more high voltage robustness improvements, making the former low repetition rate pulse energy stability issues moot, applicants do not propose to address narrowband disturbances, which can themselves evidence a blower contribution to the dose error. Rather applicants propose rather small and controlled adjustments to the blower speed so that, e.g., the scanner 120 is left free to fire at any repetition rate at any time regardless of blower speed optimization. Dose error can be significantly affected by the blower disturbance at specific laser output light pulse beam pulse repetition rates and exposure window sizes. The size of contribution can be subject to the variability of blower and chamber manufacturing, and is believed to be one of the components of the system-to-system variability of dose performance. Applicants in the present application propose a method and apparatus for dealing with such variability to more tightly control laser output light pulse beam pulse parameters regardless of such manufacturing differences, e.g., due to tolerances in chamber part manufacturing and the like, on a laser to laser basis and as lasers in the field vary in performance over lifetime, also non-uniformly.

According to aspects of an embodiment of the present invention, applicants propose to mitigate the blower contribution by making relatively small adjustments to the blower speeds based on the window size and repetition rate. The laser system controller can thereby optimize the dose performance for any window and repetition rate combination. This optimized setting, e.g., of the blower fan rotational speed, does not prevent the scanner from firing the laser at any time and at any repetition rate. So long as the laser control system knows the exposure window and repetition rate for which to optimize.

Figure 11:
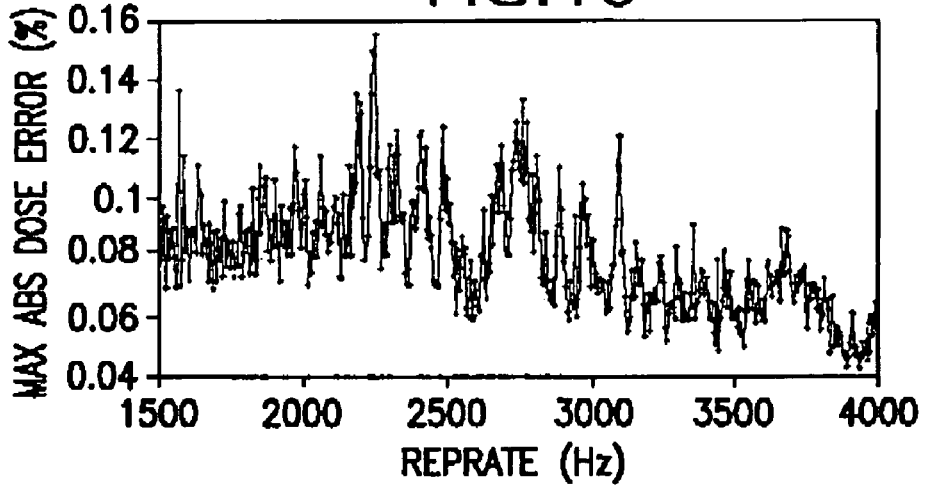
FIG. 11 illustrates a chart of dose energy error over a range of output laser light pulse beam pulse repetition rates.

In a studied case, relating to, e.g., the output laser light pulse beam pulses of an XLA 105 laser system such as is sold by applicants' assignee, illustrated by way of example in the graph of FIG. 11 almost every peak in the dose graph can be directly traced to a narrowband feature in the power spectrum and almost all are due to the 2nd harmonic of MO blower blade passing frequency.

Figure 12:
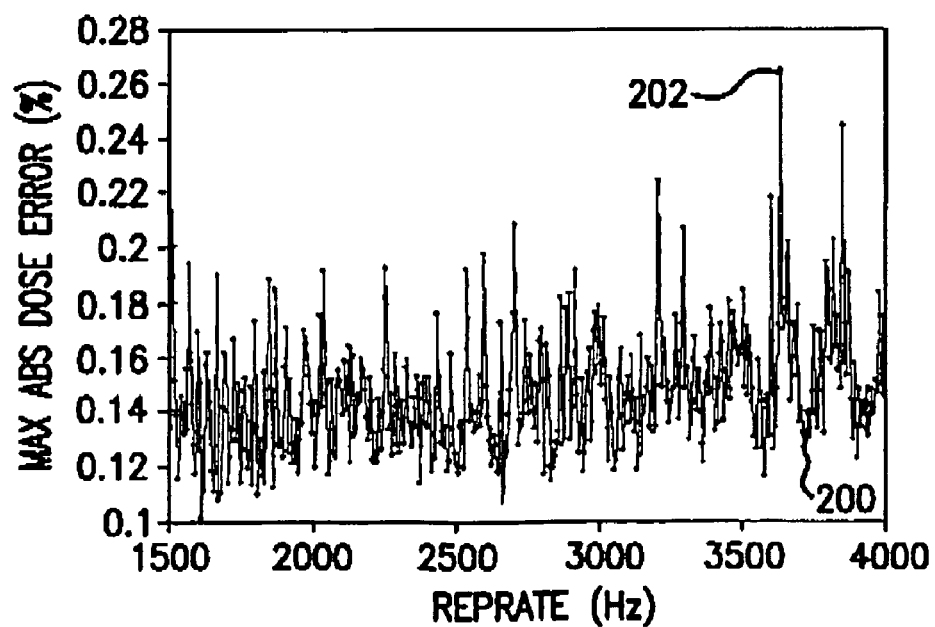
FIG. 12 illustrates another chart of dose energy error over a range of output laser light pulse beam pulse repetition rates.
Figure 13:
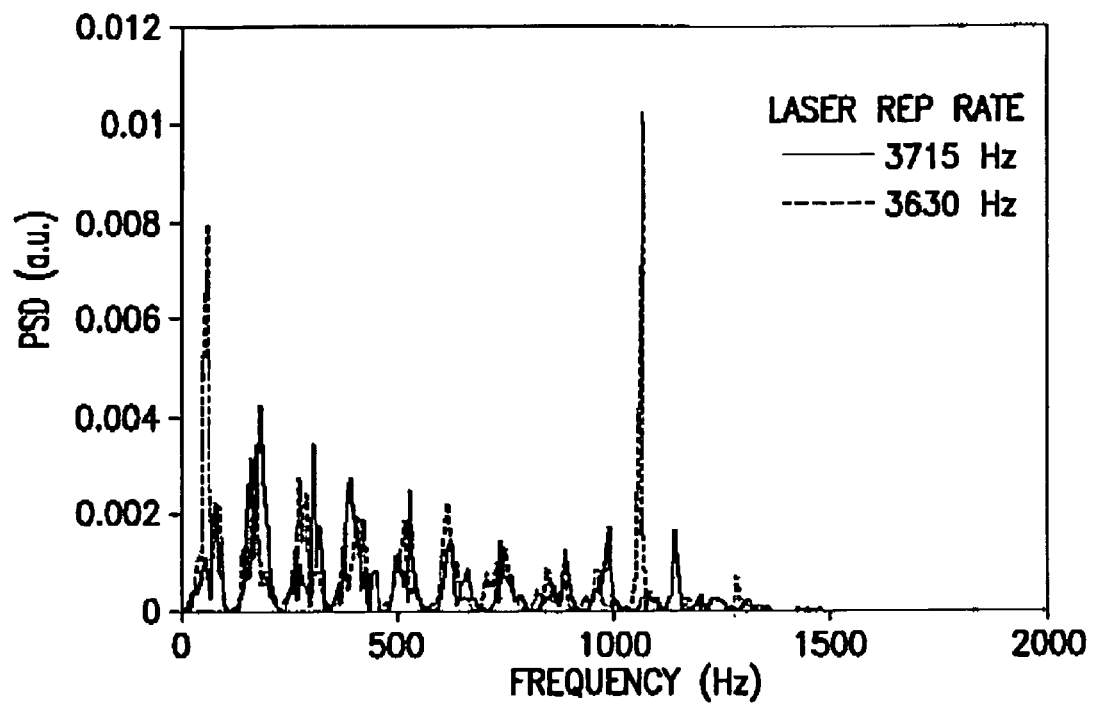
FIG. 13 illustrates a further chart of a Fourier transform of dose energy error for values of output laser light pulse beam pulse repetition rates.

Applicants have observed, e.g., that when the 2nd harmonic falls into a null of the dose filter in Fourier space (e.g. 3715 Hz.- point 200 on FIG. 12), the dose is better by up to ~0.12% than when it is at a peak (e.g. 3630 Hz-point 202 on FIG. 12). This is illustrated in FIG. 13. FIG. 13 illustrates, e.g., a peak at about 1060 $H_z$, which is the second harmonic of the blower speed 3630, i.e., as appears below the Nyquist limit for a value actually above the Nyquist limit, and this is reduces to almost zero in the blower speed to 3715 RPM.

Pulse energy error may be provided to the laser system controller 70 from instruments for measuring such at or near the workpiece surface, e.g., the wafer surface in a laser integrated circuit photolithography wafer exposing scanner 120, or may alternately be estimated from measurements of laser output light pulse beam pulse energy, e.g., on a pulse to pulse basis with a suitable pulse energy monitor 142 providing the pulse energy measurements to the laser system controller 70 signal 144.

According to aspects of an embodiment of the present invention, applicants propose to compensate for the blower-induced energy error by, e.g., an adaptive feed forward control signal in an energy controller 162 utilizing, e.g., the knowledge of the blower 106 phase information. In practice in a number of laser system families produced by applicants' assignee Cymer, Inc. $2^{nd}$ and $4^{th}$ typically and sometimes $1^{st}$ and $3^{rd}$ harmonics of the blade 108 passing frequency (passing a cutoff 114 as shown in FIG. 6) have the greatest impact, and can, e.g., be targeted in an implementation of such an embodiment. In principle a similar method can be applied to wavelength control, which also suffers a noticeable effect from the blower disturbance.

Applicants propose to obtain real time blower 106 motor (not shown) phase information, e.g., by utilizing available information, e.g., from a blower motor controller such as has bee employed by applicants' assignee's prior laser products, which may have, e.g., motor shaft phase information that can be obtained by tapping into the blower motor controller and extracting a blower motor phase signal from the hardware. Alternatively, a magnetic or optical shaft position sensor can be incorporated into the blower motor, so that the phase can be measured directly.

Figure 7:
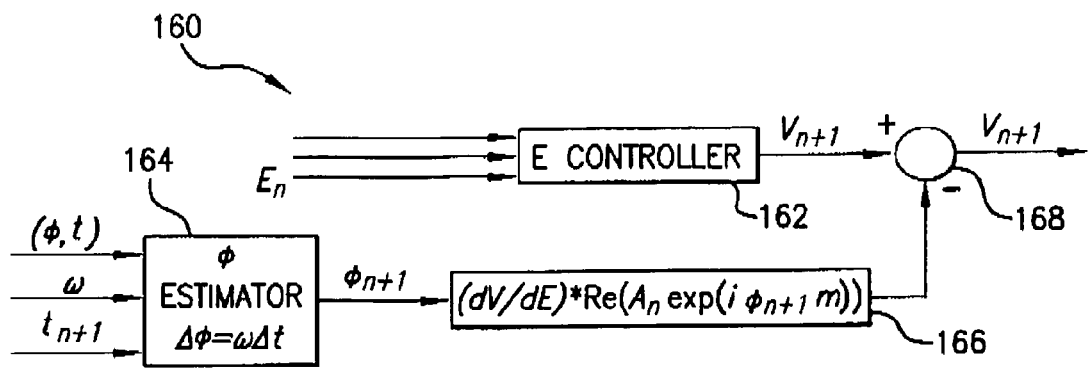
FIG. 7 shows schematically in block diagram form a control system according to aspects of an embodiment of the present invention.

This information may be used to construct, e.g., within the laser system controller 70 based upon such a phase signal 150 a laser output light pulse beam pulse energy correction signal 152 to, e.g., control the voltage across the electrodes 30, 32, e.g., by providing a voltage control signal 154 to the high voltage resonant charger 108. A pulse energy controller 162, which is illustrated schematically in FIG. 7, and may be, e.g., implemented within the laser system controller 70, may include a processor controlled by an algorithm to provide a control signal, such as a feed forward sine-wave signal that may, e.g., minimize the correlation between the pulse energy and the sine wave, e.g., based upon blower 106 speed. The amplitude and phase of the feed forward signal may be estimated, e.g., from the energy and sine wave based on blower speed, similarly to, but more simply than, adaptive noise cancellation. Applicants propose to limit the number of discrete well-known modes to work with, e.g., from 1 to 3 and preferably only 1, as opposed to an entire spectrum of noise to be dealt with in true noise cancellation.

Figure 8:
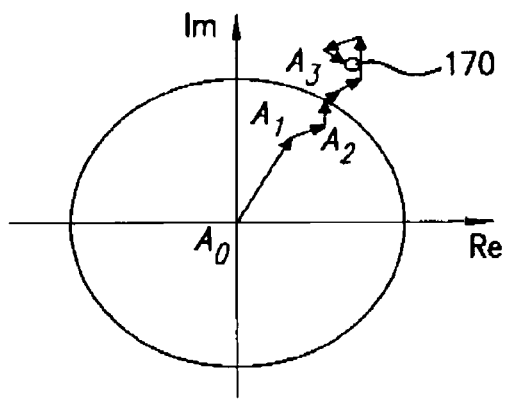
FIG. 8 shows graphically the results of operating the control system of FIG. 7.

Turning to FIG. 8 there is shown a blower induced pulse energy error correction controller 160, which may comprise, e.g., a pulse energy controller 162, a phase estimator 164, a voltage correction computer 166, which may, e.g., be the same processor or microprocessor or microprocessor used in the laser system controller 70 of one of these if the laser system controller 70 uses more than one, and a summer 168.

The energy controller 162 may receive a signal representative of the pulse energy $E_n$ for a pulse n, e.g., from a laser output light pulse beam pulse energy monitor (not shown), among other signals that the controller 162 may receive and may output, e.g., a voltage $V_{n+1}$ for the next succeeding pulse n+1. It will be understood that as is known in the art, this signal may be to a resonant charger (not shown) to charge a charging capacitor in a solid state pulsed power system (not shown) to a certain voltage, from which the voltage to be delivered across the laser chamber electrodes is known within an acceptable degree of error and the error in which from pulse to pulse, in part, is what the pulse energy controller is designed to correct, pulse-to-pulse, by modifying the voltage across the electrodes for the succeeding pulse based, at least in part, on the measured energy of the preceding laser output light pulse beam pulse.

According to aspects of an embodiment of the present invention applicants propose to add a correction to the $V_{n+1}$ signal by first estimating the blower motor phase at the time of pulse n+1 in the phase estimator 164, based, e.g., on the inputs of the phase at time t "$(\Phi,t)$", the frequency $\omega$ of the blade passages, i.e., the blower motor RPM times the number of blades as noted above, and the time of pulse n+1, $t_{n=1}$. The phase estimator 164 estimates the phase at the time of pulse n+1 from the equation:

$$\Delta\Phi = \omega \Delta t$$

where $\Delta t$ is $t_{n+1} - t$.

The voltage correction computer then computes a correction $V_c$ for $V_{n+1}$ to be applied to the output of the controller 162 in the summer 168 according to the equation:

$$V_c = (dV/dE) * Re(A_n^{(i, \Phi_{n+1}, m)})$$

where dV/dE is the current value of the slope of the voltage vs. energy curve for the given laser system being utilized by the laser system controller 70 as is known in the art, $A_n$ is the current length of a vector, such as shown in FIG. 8, with $A_n$ starting out as $A_0=0$, and m is the mode, i.e., is based on the harmonic(s) being used, e.g., 46 for a second harmonic of a 23 blades blower rotary fan. $A_n$ is also computed from the preceding value of a, i.e., $A_{n-1}$ using the equation:

$$A_n - A_{n-1} = \gamma \frac{1}{w} \sum_{j=n-w+1}^{n} E_j \exp(-i\varphi_j m)$$

where $\gamma$ is a a gain factor between 0 and 1.0, w is a selected number of laser output light pulse beam pulses in an evaluation window, e.g., 7 as illustrated graphically in FIG. 8.

According to aspects of an embodiment of the present invention it is assumed that some signal representative of the blower motor phase can be extracted from the blower motor controller (100 in FIG. 6). The motor phase and corresponding timing need to be known with enough accuracy, e.g., to infer the phase of a high multiple of the blower rotational frequency, typically 46=2*23 blades. This means motor phase needs to be known with ~2% accuracy. It is also assumed that the speed changes very slowly, so that a new phase reading $\Phi_{n+1}$ is not necessary for every shot (laser output light pulse beam pulse). Multiple shots, e.g., 8 as noted above, can contribute to the evaluation window, in order to help obtaining good phase signal accuracy. As shown graphically in FIG. 8, this results in the vectors $A_n$-$A_{n-1}$ converging to a point 170, at which the amplitude and phase of the feedforward signal reaches the value such that it completely compensates for the disturbance created by the blower harmonic m, i.e., the correlation between the measured laser light pulse energy and the blower harmonic becomes zero, and the correlation between the measured laser light pulse energy and the feedforward signal becomes zero.

The 1/w term forms a correction window sample of w pulses to low pass filter the results. The value selected for w could be 1, but the resultant correction value computed would be too noisy, with only the one value computed, i.e., at j=n.

As noted, according to aspects of an embodiment of the present invention, a change in the blower motor phase is from pulse to pulse can be utilized to calculate a correction that arises from blower motor induced acoustic noise in the chamber as that correction signal varies from pulse to pulse according to the blower motor behavior indicated by the change in blower motor phase from pulse to pulse, with, e.g., the phase for the next pulse impacting the new correction signal for that pulse.

It will be understood by those skilled in the art that the above describes aspects of an embodiment of the present invention whereby a line narrowed gas discharge laser system may be adapted to fine tune a spectral quality of a loser output light pulse beam which may be, e.g., and integral percentage value of the spectrum, e.g., e95 or a full width at some percentage of the max value, e.g., FWHM. The system, adapted to fine tune the spectral quality of the spectrum, may comprise, as will be understood by those skilled in the art, e.g., a rear reflector, which may be part of a line narrowing package or module and a partially reflective output coupler, e.g., forming the oscillator cavity.

Together, along with certain geometries of the cavity, the rear reflector and the output coupler, at least in part, may serve to define a number of passes of the laser light pulse beam through the resonator cavity while the laser gas medium is excited to cause lasing by the electrical discharge in a laser chamber within the oscillator cavity containing a lasing medium gas, such as an excimer gas laser mixture of, e.g., an ArF, KrF; XeCl, XeF or the like gas mixture, of a molecular $F_2$ gas mixture, e.g., with other rare gases, e.g., neon of helium. The system may also comprise at least one peaking capacitor, one terminal of which may be electrically connected to the chamber housing and to a first one of a pair of gas discharge electrodes and a second one of the pair of gas discharge electrodes connected to an opposite terminal of the at least one peaking capacitor and insulated from the chamber housing.

The gas discharge when a high voltage, which may be a positive going voltage or a negative going voltage or one followed by the other and with some ringing thereafter, may excite the lasing gas mixture for some period of time during which lasing occurs format an output laser light pulse beam, temporally distributed portions of which may have passed through the line narrowing package/module more or less times than others resulting in a distribution within the temporally distributed portions of the laser output light pulse beam of the integrated spectral purity (bandwidth, measured, e.g., by E95 or FWHM).

A current return path may exist by which the at least one peaking capacitor may be electrically connected to the chamber housing, the one terminal of the at least one peaking capacitor, the first one of the pair of electrodes, the lasing medium gas, the second one of the pair of gas discharge electrodes, the current return path and the second terminal of the at least one peaking capacitor may form a head current inductive loop having an inductance value unique to the particular head current inductive loop for a given laser system. That is to say, that the particular construction of the loop and its components, variations in manufacturing tolerances and material composition, e.g., due to impurities in the materials as constructed and other factors, or relatively small amounts may lead to relatively large percentage changes in the head inductance, e.g., 10 to 50 percent.

This, according to aspects of an embodiment of the present invention has been determined by applicants to change certain aspects of the discharge across the pair of electrodes, e.g., changing the shape and/or duration of the high voltage appearing across the electrodes, which those skilled in the art will understand may first be a large positive or negative voltage, e.g., of around 20,000 volts, followed by an almost equally large voltage of the opposite polarity and some ringing thereafter, which may also sustain significant lasing.

A spectral quality tuning mechanism according to aspects of an embodiment of the present invention may comprise a mechanism for changing the particular head current inductive loop inductance value for the particular head current inductance loop. That is to say, e.g., at the time of manufacture, the spectral quality parameter in question, e.g., bandwidth, e.g., measured by E95 or FWHM for a particular laser system of a particular design may be tested, e.g., using highly accurate, though expensive and bulky spectrometry instruments, e.g., a LTB grating spectrometer. Variations for a given laser system may then be tuned with the tuning mechanism, e.g., to both adjust the largest value of the spectral parameter being measured as a laser system output and or the range of such values for the given laser system, e.g., before shipment. In addition as may be necessary over laser life due to other changes affecting laser output light pulse beam spectral qualities, e.g., electrode erosion and resultant changes in the discharge shape, optical element degradation, etc. similar adjustments may be made to the tuning mechanism.

Therefore, variations from laser system to laser system, even for a particular laser system design, may be fine tuned at manufacture and over laser operating life to account in minor variations from laser system to laser system to assist in each such system being able to meet the stringent spectral quality parameter requirements placed on such lasers today as a result of the increasing quest for tighter control of, e.g., bandwidth, e.g., both from a not to exceed standpoint and a maintenance with a certain narrow range from max allowable to min allowable, for, e.g., modern integrated circuit photolithography requirements, e.g., mask work optical proximity control requirements.

As noted the cavity may comprise a line narrowing module within the oscillator cavity and the apparatus may provide for the change in the particular head current loop inductance tuning the duration of the gas discharge for the particular gas discharge laser system and the impact of the line narrowing module on the spectral quality of the laser output light pulse beam produced by the particular laser system, i.e., on a system to system basis, within a particular system design, e.g., an NL-7000 or an ELS7010 or the like, to correct for manufacturing and/or material variances or the like, or variations from laser system to laser system over laser operating lifetime. The spectral quality tuning mechanism may comprise a mechanism that, e.g., changes the size of the head current inductive loop for the particular laser system. The particular laser system, by its design, may also comprise a high voltage bus in electrical connection with the opposite terminal of the at least one peaking capacitor and the spectral quality tuning mechanism may comprise a displacement control mechanism controlling the displacement of the high voltage bus from the opposite terminal of the at least one peaking capacitor. This may take the form of, e.g., a manually operated mechanism, i.e., a threaded screw for example, which when operated may serve, e.g., to adjust the particular spectral quality for a particular laser system at the time of manufacture or as may be necessary in the field during laser system operating life, e.g., by changing the physical size of the head current inductive loop inductance, e.g., by changing the amount of displacement between the capacitor (bank) terminal(s) and the high voltage bus.

Alternatively according to aspects of an embodiment of the present invention, the spectral quality tuning mechanism may comprise an active control system to adjust the particular head current inductive loop inductance based upon feedback control of a controller having as an input an output of a spectral quality measuring system.

Figure 10:
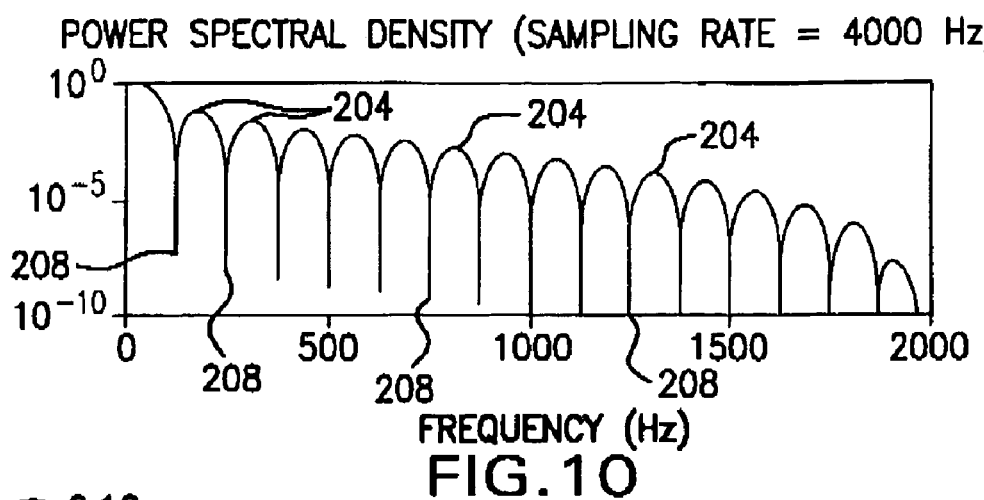
FIG. 10 illustrates graphically a Fourier power spectrum of the burst shown in FIG. 9.
Figure 14:
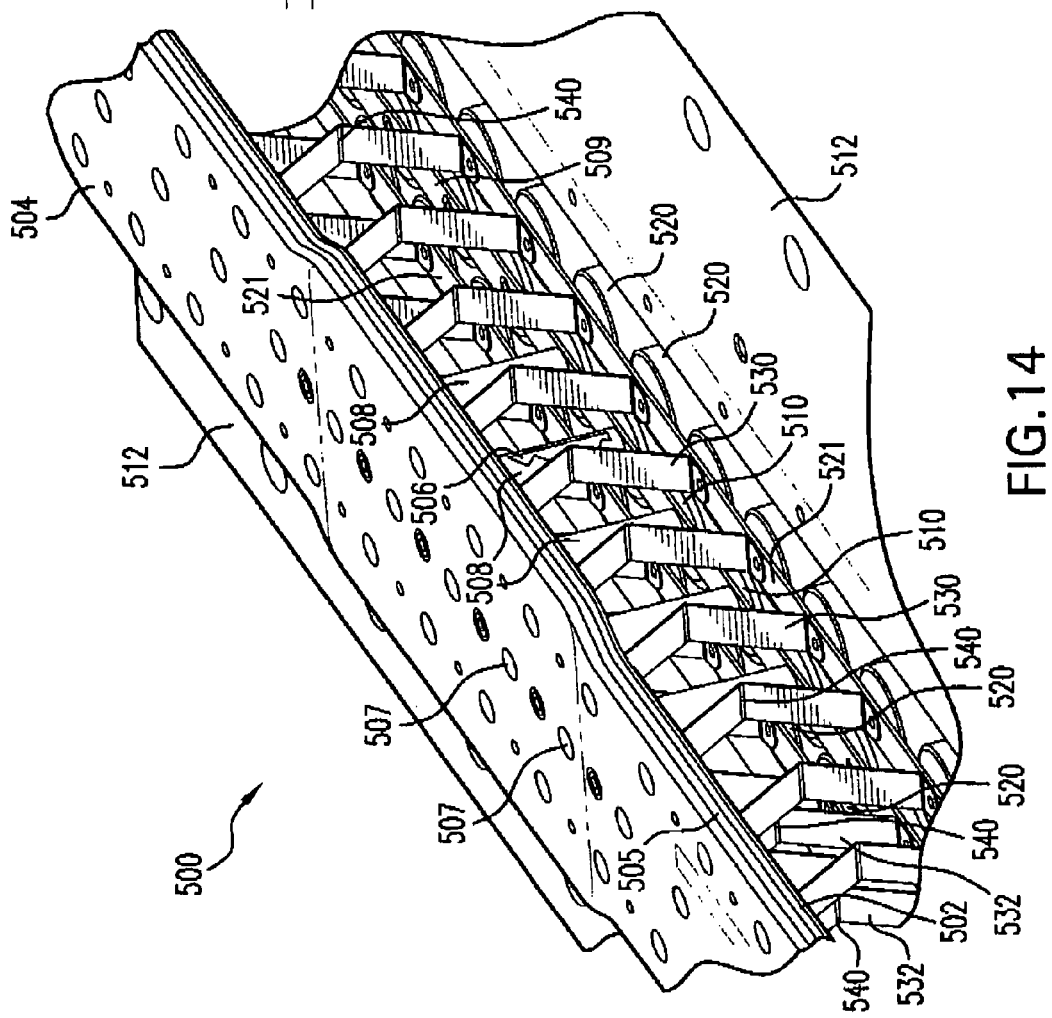
FIG. 14 illustrates a portion of a compression head according to aspects of an embodiment of the present invention with a mechanism to selectively vary the inductance in the compression head inductance loop.

It will also be understood by those skilled in the art that according to aspects of an embodiment of the present invention, a high speed, e.g., 3 KHz and above gas discharge laser system adapted to control the pulse energy of a laser output light pulse beam pulse dose stability at a particular pulse repetition rate and for a given exposure window number of pulses may comprise a laser gas circulating rotary blower such as a squirrel cage blower fan as is well known in the art; a blower rotation speed controller operating the blower within a currently applicable range of appropriate arc free blower speeds for a given laser output light pulse beam pulse repetition rate, e.g., which can be determined empirically for a given laser and which is typically a range of fan rotational speeds selected to be above a fan rotation speed at which the arc free operation can occur, given some selected margin of leeway, i.e., the blower speed creating enough gas volumetric flow around the chamber for a given chamber construction and flow path and a given laser output light pulse beam pulse repetition rate, to remove debris, such as, ionized constituents of the lasing gas medium caused be the just preceding gas discharge through the gas medium, which debris may, if remaining closed enough to the discharge region between the electrodes, cause an arcing, e.g., from the high voltage cathode to the grounded chamber and thus seriously detract from the succeeding gas discharge in the gas discharge region between the electrodes and also, therefore, seriously detract from a variety of output laser light pulse beam pulse parameters, such as wavelength, bandwidth and dose and does stability. The apparatus and method may also comprise a pulse energy controller providing an output blower rotation speed within the currently applicable range of arc free blower speeds based upon the pulse repetition rate and a signal representative of the exposure window number of pulses. The blower rotation speed may be selected to align blower speed harmonic related dose transients within a respective one of a plurality of exposure window and laser pulse repetition rate related Fourier transform null points. It will be understood that the peaks and nulls as illustrated in FIGS. 14 and 10 respectively may not be moved into perfect alignment by a respective change in blower motor rotational speed, however, the effect of relatively close alignment, the effective summing of the peaks 204 with the nulls 208 can significantly reduce the intensity of the blower motor speed harmonic induced peaks 204 in the time domain. The blower speed may be being selected to place an integer number of the disturbance waveform within the time period of the exposure window.

Turning now to FIG. 14 there is shown by way of example another embodiment of a head inductance tuning/modification mechanism 500. The head inductance tuning mechanism 500 may comprise a head inductance modification bus plate 502, which may be insulated from a high voltage bus plate 504 by an insulator layer 505. The high voltage bus plate may be in electrical contact with an upstream portion of a solid state pulse power system (not shown), a portion of which is shown schematically by way of example in FIG. 15, with the high voltage bus plate 504, known by applicants as a corona plate, in electrical contact with $L_{p-1}$, a saturable inductor switch in a prior stage of the compression circuit which functions to pass charge from a prior stage capacitor (bank of capacitors) $C_{p-1}$ to a peaking capacitor (bank of peaking capacitors 520). The opposite terminals of the peaking capacitors 520 may be electrically connected to the grounded chamber head 512.

Also connected to node 600 may be a cathode electrode 522, which may be in electrical connection to the corona plate 504 at node 600 by a plurality of standoffs 506 connected to the corona plate 504 by screws (not shown) through screw holes 507, and connected at the opposite ends thereof to feed through bus plate 509, which is in turn electrically connected to a plurality of high voltage feed through 510, each connected through a main insulator (not shown) to the cathode 522. The standoffs 506 may be insulated from an inductance loop bus plate 502 by insulation 508, with the insulation 508 shown partially cut away to show an internally disposed standoff 506 in FIG. 14.

Figure 15:
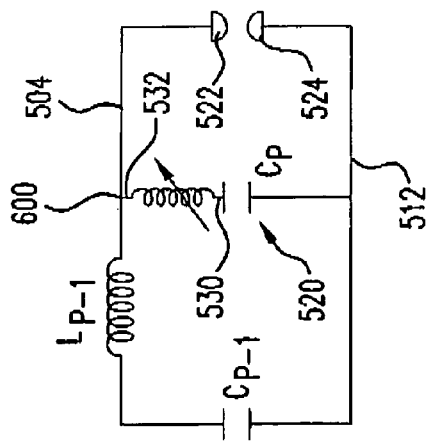
FIG. 15 shows schematically an equivalent circuit for the structure shown in FIG. 14.

The peaking capacitors 520 of the peaking capacitor bank $C_{p-1}$ may be electrically connected to the node 600 through a plurality of flex springs 530 electrically connecting the capacitors 520 to the inductance loop bus plate 502 and by a plurality of flex springs 532 electrically connected to the inductance loop bus plate 502 and the feed through bus plate 509. Thus the equivalent circuit of FIG. 15 is formed. In this manner, the head inductance $L_v$ can be made variable to change the timing of the discharge between the electrodes 522 and 524 and thus modify such things as the timing of the gain formed in the lasing gas medium, and therefore bandwidth, since, e.g., the gain change can modify the timing of the emission of a laser pulse by the laser system (not shown) and thus the overall impact of a line narrowing module on the final bandwidth of the spectrum of the finally emitted laser pulse.

Figure 16:
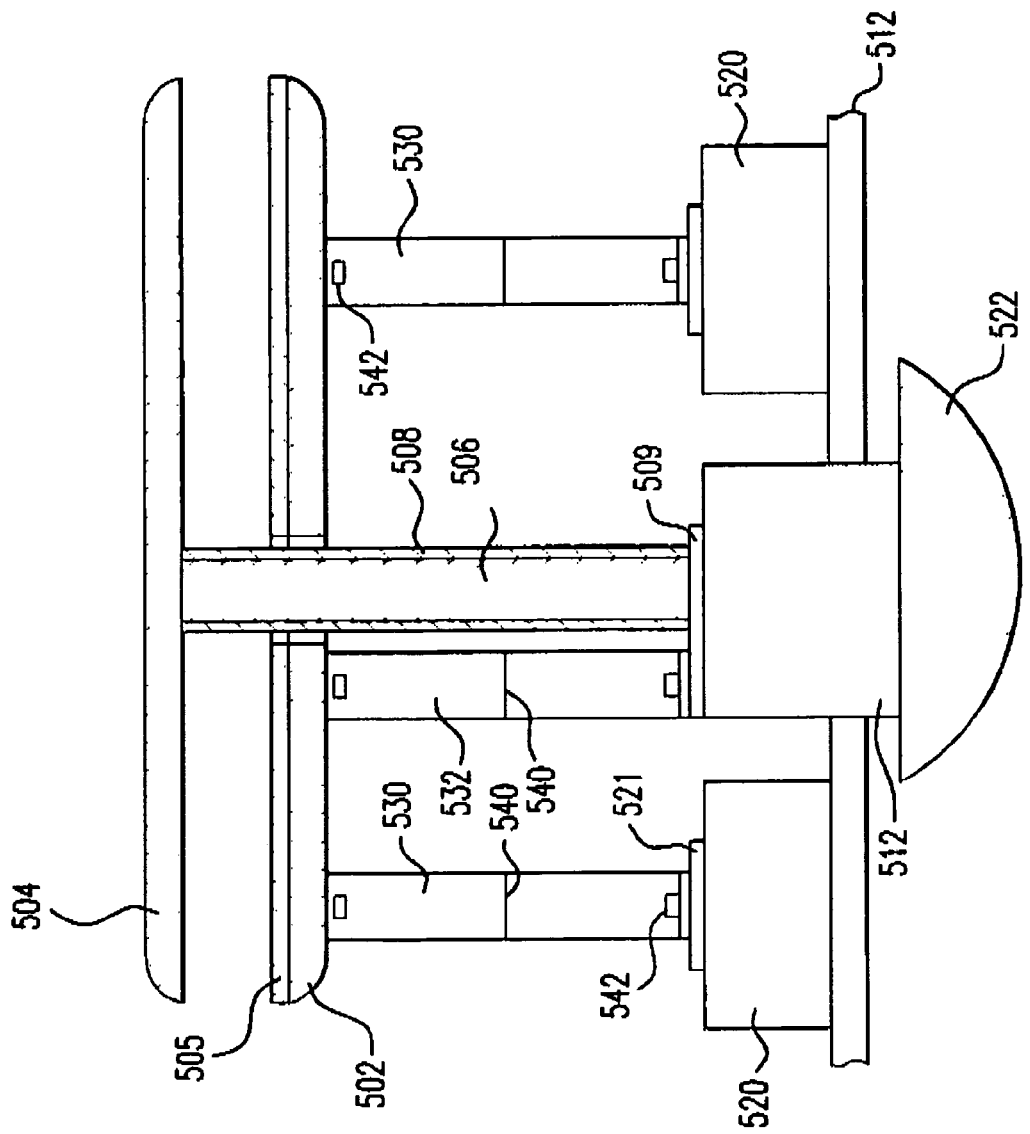
FIG. 16 shows an end view of a structure substantially the same as that shown in FIG. 14.

This exemplary embodiment is shown partly schematically and partly in cross section in FIG. 16. FIG. 16 shows a partially cross-sectioned end view of the structure of FIG. 14 partially modified for illustrative purposes, e.g., showing the high voltage feed through bus 509 slightly extended to the left as illustrated in FIG. 16 compared to FIG. 14 to show the springs 532 and the interconnection electrically of the high voltage feed through bus 509 and the high voltage terminal of the capacitors 520 in the capacitor bank $C_p$ through the inductance loop bus plate 502, to form the equivalent circuit as shown in FIG. 15. As can be seen in FIGS. 14 and 20, the inductance loop bus plate 502 can be moved relative to the corona plate 504 with a suitable actuator, e.g., a stepper motor (not Shown in FIG. 14 or 26), with the electrical contact between the node 600 in FIG. 15, connecting the corona plate to the cathode (through the standoffs 506 and high voltage bus 509) and to the high voltage terminal of the capacitors 520 (through the high voltage feed through bus 509 the springs 532, the inductance loop bus plate 502, the springs 530 and the capacitor high voltage bus 521). The springs 530, 532 may flex and expand at hinge points 540 as the inductance loop bus plate 502 moves up and down as illustrated in FIGS. 14 and 16 and thus continue to make their electrical connections. The springs 530, 532 may be attached to the respective bus 509, 521 by any suitable means, e.g., screws 542, which may also serve, at least in part, to attach the respective buses 509, 521 to, respectively the high voltage feedthroughs 510 and the high voltage side of the capacitors 520.

It will also be understood by those skilled in the art that according to aspects of an embodiment of the present invention a high repetition rate gas discharge laser system adapted to control the pulse energy of a laser output light pulse beam pulses at a particular pulse repetition rate which may comprise a laser gas circulating fan, e.g., a squirrel cage rotary fan rotating at some RPM and which can create, e.g., acoustic disturbances within the laser gas discharge chamber, e.g., having harmonics that can result in transients in output laser light pulse beam pulses, e.g., in bandwidth, center wavelength, dose per pulse and dose stability from pulse to pulse; a pulse energy controller which may be part of a larger laser system controller of a separate programmed processor, microprocessor or microcontroller, producing a pulse energy control signal for a laser output light pulse beam output pulse at least in part based upon a measured laser output light pulse beam pulse energy for at least one preceding laser output light pulse beam pulse; a pulse energy control signal correction mechanism that may comprise: a gas circulating fan phase estimator producing a phase estimation for the laser output light pulse beam pulse; and a correction computer computing the correction for the pulse based on the phase estimate and a selected harmonic mode.

It will be understood by those skilled in the art that the aspects of embodiments of the present invention disclosed above are intended to be preferred embodiments only and not to limit the disclosure of the present invention(s) in any way and particularly not to a specific preferred embodiment alone. Many changes and modification can be made to the disclosed aspects of embodiments of the disclosed invention(s) that will be understood and appreciated by those skilled in the art. The appended claims are intended in scope and meaning to cover not only the disclosed aspects of embodiments of the present invention(s) but also such equivalents and other modifications and changes that would be apparent to those skilled in the art. In additions to changes and modifications to the disclosed and claimed aspects of embodiments of the present invention(s) noted above the following could be implemented.

We claim:

1. A line narrowed gas discharge laser system adapted to fine tune a spectral quality of a laser output light pulse beam comprising:

an oscillator cavity;

a laser chamber within the oscillator cavity comprising a chamber housing containing a lasing medium gas;

at least one peaking capacitor one terminal of which is electrically connected to the chamber housing and to a first one of a pair of gas discharge electrodes;

a second one of the pair of gas discharge electrodes connected to an opposite terminal of the at least one peaking capacitor and insulated from the chamber housing;

a current return path by which the at least one peaking capacitor is electrically connected to the chamber housing;

the one terminal of the at least one peaking capacitor, the first one of the pair of gas discharge electrodes, the lasing medium gas, the second one of the pair of gas discharge electrodes, the current return path and the second terminal of the at least one peaking capacitor forming a head current inductive loop having an inductance value unique to the particular head current inductive loop for a given laser system;

a spectral quality timing mechanism comprising a mechanism for changing the particular head current inductive loop inductance value for the particular head current inductance loop, wherein the spectral tuning mechanism further comprises an active control system to adjust the particular head current inductive loop inductance based upon feedback control of a controller having as an input an output of a spectral quality measuring system.

2. The apparatus of claim 1 further comprising:
a line narrowing module within the oscillator cavity;
the change in the particular head current loop inductance tuning the duration of the gas discharge for the particular gas discharge laser system and the impact of the line narrowing module on the spectral quality of the laser output light pulse beam produced by the particular laser system.

3. The apparatus of claim 1 further comprising:
the spectral quality is bandwidth.

4. The apparatus of claim 2 further comprising:
the spectral quality is bandwidth.

5. The apparatus of claim 1 further comprising the spectral quality tuning mechanism comprising a mechanism that changes the size of the head current inductive loop for the particular laser system.

6. The apparatus of claim 2 further comprising the spectral quality tuning mechanism comprising a mechanism that changes the size of the head current inductive loop for the particular laser system.

7. The apparatus of claim 3 further comprising the spectral quality tuning mechanism comprising a mechanism that changes the size of the head current inductive loop for the particular laser system.

8. The apparatus of claim 4 further comprising the spectral quality tuning mechanism comprising a mechanism that changes the size of the head current inductive loop for the particular laser system.

9. The apparatus of claim 5 further comprising:
a high voltage bus in electrical connection with the opposite terminal of the at least one peaking capacitor;
the spectral quality tuning mechanism comprising a displacement control mechanism controlling the displacement of the high voltage bus from the opposite terminal of the at least one peaking capacitor.

10. The apparatus of claim 6 further comprising:
a high voltage bus in electrical connection with the opposite terminal of the at least one peaking capacitor;
the spectral quality tuning mechanism comprising a displacement control mechanism controlling the displacement of the high voltage bus from the opposite terminal of the at least one peaking capacitor.

11. The apparatus of claim 7 further comprising:
a high voltage bus in electrical connection wit the opposite terminal of the at least one peaking capacitor;
the spectral quality tuning mechanism comprising a displacement control mechanism controlling the displacement of the high voltage bus the opposite terminal of the at least one peaking capacitor.

12. The apparatus of claim 8 further comprising:
a high voltage bus in electrical connection with the opposite terminal of the at least one peaking capacitor;
the spectral quality tuning mechanism comprising a displacement control mechanism controlling the displacement of the high voltage bus from the opposite terminal of the at least one peaking capacitor.

13. The apparatus of claim 1 further comprising:
the spectral quality tuning mechanism comprising the active control system to adjust the particular head current inductive loop inductance based upon feedback control of a controller configured to actively control the inductance to fine tune the spectral quality of the laser output light pulse beam intermediate a first burst and a subsequent burst.

14. The apparatus of claim 3 further comprising:
the spectral quality tuning mechanism comprising an active control system to adjust the particular head current inductive loop inductance based upon feedback control of a controller configured to actively control the inductance to fine tune the spectral quality of the laser output light pulse beam intermediate a first burst and a subsequent burst.

15. A method of bandwidth control for a line narrowed gas discharge laser system comprising an oscillator cavity; a laser chamber within the oscillator cavity comprising a chamber housing containing a lasing medium gas; a pair of discharge electrodes within the laser cavity; a high voltage feed through a chamber head to one of the electrodes, comprising a head current inductive loop, having an inductance, and a line narrowing module within the laser cavity, comprising the steps of:
utilizing an active bandwidth quality timing mechanism comprising a mechanism for changing the head current inductive loop inductance value in order to change the timing of the discharge between the electrodes to modify the timing of the gain formed in the lasing gas medium, and thereby modify the dining of the emission of a laser pulse by the oscillator cavity, to thereby modify the overall impact of the line narrowing module on the final bandwidth of the spectrum of the emitted laser pulse, in response to a feedback signal indicative of bandwidth.

16. The method of claim 15 further comprising the spectral quality tuning mechanism comprising a mechanism that changes the size of the head current inductive loop for the particular laser system.

17. The method of claim 15 further comprising:
a high voltage bus in electrical connection with a high voltage terminal of the at least one peaking capacitor;
the spectral quality tuning mechanism comprising a displacement control mechanism controlling the displacement of the high voltage bus from the opposite high voltage terminal of the at least one peaking capacitor.

18. The method of claim 15 further comprising:
the spectral quality tuning mechanism comprising an active control system to adjust the particular head current inductive loop inductance based upon feedback control of a controller having as an input an output of a spectral quality measuring system.

19. The method of claim 16 further comprising:
the spectral quality taxiing mechanism comprising an active control system to adjust the particular head current inductive loop inductance based upon feedback control of a controller having as an input an output of a spectral quality measuring system.

20. The method of claim 17 further comprising:
the spectral quality tuning mechanism comprising an active control system to adjust the particular head current inductive loop inductance based upon feedback control of a controller having as an input an output of a spectral quality measuring system.

21. A method of bandwidth control for a line narrowed gas discharge laser system comprising an oscillator cavity; a laser chamber within the oscillator cavity comprising a chamber housing containing a lasing medium gas; a pair of discharge electrodes within the laser cavity; a high voltage feed through a chamber head to one of the electrodes, comprising a head current inductive loop, having an inductance, and a line narrowing module within the laser cavity, comprising the steps of:

utilizing an active bandwidth quality tuning mechanism comprising a mechanism for changing the head current inductive loop inductance value in order to modify the turn on of the laser gain in the laser gain medium between the electrodes to modify the number of round trips though the line narrowing module, in response to a feedback signal indicative of bandwidth as an output pulse of the oscillator cavity develops, in response to a feedback signal indicative of bandwidth.

22. The method of claim 21 further comprising the spectral quality tuning mechanism comprising a mechanism that changes the size of the head current inductive loop for the particular laser system.

23. The method of claim 22 further comprising:
a high voltage bus in electrical connection with a high voltage terminal of the at least one peaking capacitor;
the spectral quality tuning mechanism comprising a displacement control mechanism controlling the displacement of the high voltage bus from the opposite high voltage terminal of the at least one peaking capacitor.

24. The method of claim 21 further comprising:
the spectral quality tuning mechanism comprising an active control system to adjust the particular head current inductive loop inductance based upon feedback control of a controller having as an input an output of a spectral quality measuring system.

25. The method of claim 22 further comprising:
the spectral quality tuning mechanism comprising an active control system to adjust the particular head current inductive loop inductance based upon feedback control of a controller having as an input an output of a spectral quality measuring system.

26. The method of claim 23 further comprising:
the spectral quality tuning mechanism comprising an active control system to adjust the particular head current inductive loop inductance based upon feedback control of a controller having as an input an output of a spectral quality measuring system.

* * * * *